United States Patent
Paxinos et al.

(10) Patent No.: US 10,242,664 B2
(45) Date of Patent: Mar. 26, 2019

(54) SYSTEM AND METHOD FOR PROCESSING FLAGGED WORDS OR PHRASES IN AUDIBLE COMMUNICATIONS

(71) Applicant: netTALK.com, Inc., North Miami, FL (US)

(72) Inventors: Garry M. Paxinos, Pompano Beach, FL (US); Kenneth Alvin Hosfeld, Coral Springs, FL (US); Anastasios Kyriakides, Hollywood, FL (US); Anastasios Nicholas Kyriakides, II, Plantation, FL (US)

( * ) Notice: Subject to any disclaimer, the term of this patent is extended or adjusted under 35 U.S.C. 154(b) by 361 days.

(21) Appl. No.: 14/675,660

(22) Filed: Mar. 31, 2015

(65) Prior Publication Data

US 2015/0279357 A1 Oct. 1, 2015

Related U.S. Application Data

(60) Provisional application No. 61/972,593, filed on Mar. 31, 2014.

(51) Int. Cl.
*G10L 15/08* (2006.01)
*G10L 15/26* (2006.01)
(Continued)

(52) U.S. Cl.
CPC ........ *G10L 15/08* (2013.01); *G06F 17/30746* (2013.01); *G10L 15/1807* (2013.01); *G10L 15/26* (2013.01); *G10L 2015/088* (2013.01)

(58) Field of Classification Search
CPC ..... G10L 15/08; G10L 15/1807; G10L 15/26; G10L 2015/081; G10L 15/083; G10L 2015/085; G10L 2015/086; G10L 2015/088; G10L 15/18; G10L 15/1815; G10L 15/1822; G10L 15/183; G10L 15/265; G10L 15/28; G10L 15/285; G06F 17/30

(Continued)

(56) References Cited

U.S. PATENT DOCUMENTS

| | | | | |
|---|---|---|---|---|
| 5,404,435 A | * | 4/1995 | Rosenbaum | ...... G06F 17/30017 707/E17.009 |
| 2014/0249813 A1 | * | 9/2014 | Hoeg | ...................... G06F 17/24 704/235 |

FOREIGN PATENT DOCUMENTS

CN 103020230 A * 4/2013

* cited by examiner

*Primary Examiner* — Dwayne D Bost
*Assistant Examiner* — Stephen M Brinich
(74) *Attorney, Agent, or Firm* — The Keys Law Firm PLLC

(57) ABSTRACT

A system and method adapted to allow a user to be automatically presented with digitally available content related to words spoken or heard by a user. The system and method for processing flagged words in audible communications is operative to analyze the content in an audible communication, as well as stress levels associated with different segments of the conversation, in order to flag key words and/or phrases and associate the flagged words and/or phrases with relevant digital content, which may be provided in the form of web links, advertising offers, and even warnings to the communications to be delivered with the audible communication. Thus, the system and method for processing flagged words in audible communications in operation enables a user to receive actionable information and/or advertisements relevant to a user's conversations or media heard (and/or viewed) in real time.

20 Claims, 2 Drawing Sheets

(51) Int. Cl.
*G06F 17/20* (2006.01)
*G10L 15/18* (2013.01)
*G06F 17/30* (2006.01)

(58) Field of Classification Search
USPC ............................... 704/235, 1–10, E15.043
See application file for complete search history.

SYSTEM AND METHOD FOR PROCESSING FLAGGED WORDS OR PHRASES IN AUDIBLE COMMUNICATIONS

CROSS REFERENCE TO RELATED APPLICATIONS

This application claims the benefit of and incorporates by reference U.S. provisional patent application Ser. No. 61/972,593 filed Mar. 31, 2014.

BACKGROUND OF THE INVENTION

Field of the Invention

This invention relates generally to electronics systems and software implemented methods and, more particularly, to a system and method for flagging desired words or phrases in audible communications and processing the flagged items in real time to associate related content therewith.

Description of the Prior Art

Systems which associate certain preset character strings in text based communications with hyperlinks based on characteristics of the character strings, such as words or phrases formed, are well known. A problem which still exists, however, is that existing systems lack the logic framework or rule methodology to flag words/phrases spoken or heard by a user on a device with computing capability, such as a computer, a smart phone (or other mobile computer), or a smart television and processes the words/phrases in real time, accounting for profile information about the user, to enable relevant content to be associated with the words/ phrases and provided to the user. Thus, there remains a need for a system and method for processing flagged words in audible communications which can automatically flag words and/or phrases in audible communications and avail relevant or related content to a user in real time. It would be helpful if such a system and method for processing flagged words in audible communications was embodied in application software executable on the user's local device. It would be additionally desirable for such a system and method for processing flagged words in audible communications to utilize a general information relating to content providers and unique information relating to a user's profile in determining the relevant or related content to avail to the user.

The Applicant's invention described herein provides for a system and method adapted to allow a user to be automatically presented with digitally available information or content related to words spoken or heard by a user. The primary components in Applicant's system and method for processing flagged words in audible communications are a local computer device containing instructions embodied in software and a server computer system containing instructions embodied in software. When in operation, the system and method for processing flagged words in audible communications enables a user to receive actionable information and/or advertisements relevant to a user's conversations or media heard (and/or viewed) in real time. As a result, many of the limitations imposed by prior art systems are removed.

SUMMARY OF THE INVENTION

Audible communications (also referred to herein as voice communications) have traditionally been between two or more people for generalized and/or specific communication of information. In recent times, audible communications have additionally comprised simple interactive voice responses (IVRs) from a computer, which replace or augment live customer support or order handling/processing centers. The present invention relates to intelligently flagging and processing associated or disassociated words and/ or phrases from one or more sources of audible communications (with or without using stress analysis) carried out in the normal day to day life to identify and provide content that is relevant and/or useful to the speaker(s) and/or advertiser(s).

The system is hereinafter referred to as "SpeechProb™ system." The SpeechProb system adds useful, targeted content via a communications system (computer network, voice messaging, SMS, MMS, e-mail, etc.) in mobile and non mobile devices having computing capability (e.g., smartphones, cell phones other handheld devices, PCs, smart cars, etc) while not disrupting the voice communications.

Simplistically, the SpeechProb system analyzes the content of a conversation as well as stress levels associated with different segments of the conversation to flag key words and/or phrases, associates the flagged words and/or phrases with relevant content, and adds information on or a pointer to the relevant content in the form of web links, advertising offers, and even warnings to the communications to be delivered with the audible communication. For example, if three people are discussing getting together for a round of golf this Saturday, upon recognizing and flagging the word "golf," the SpeechProb system would gather information relating to location of the people in the discussion as well as other pertinent preferences, associate the word golf with a list of nearby golf courses (that meet the common preferences of the group), and transmit a message to at least one member of the discussion containing the list of nearby golf courses. In addition, the SpeechProb system can flag "Saturday," and return results that show only nearby golf courses with tee times available.

It is an object of this invention to provide a system and method for processing flagged words in audible communications which can automatically flag words and/or phrases in audible communications and avail relevant or related content to a user in real time.

It is another object of this invention to provide a system and method for processing flagged words in audible communications that is embodied in application software executable on the user's local device.

It is yet another object of this invention to provide a system and method for processing flagged words in audible communications that utilizes general information relating to content providers and unique information relating to a user's profile in determining the relevant or related content to avail to the user.

These and other objects will be apparent to one of skill in the art.

DETAILED DESCRIPTION OF THE INVENTION

Figure 1A:
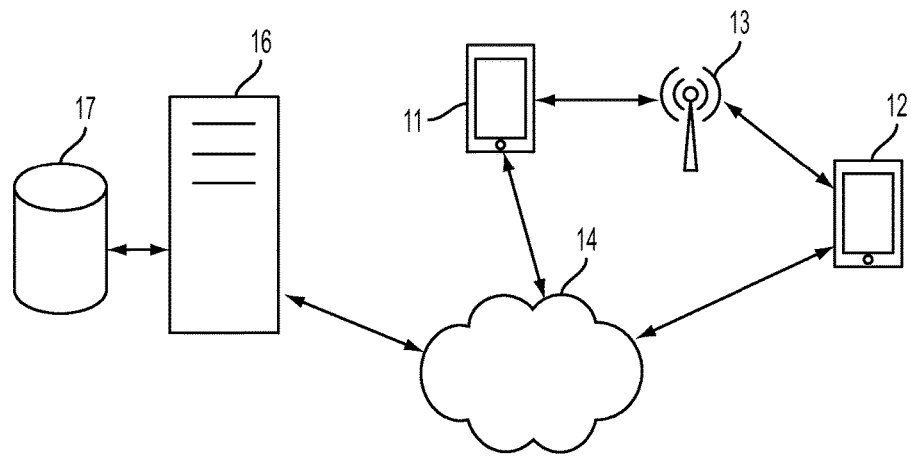
FIG. 1a shows the components of a phone call embodiment of a SpeechProb system and method in accordance with the present invention.
Figure 1B:
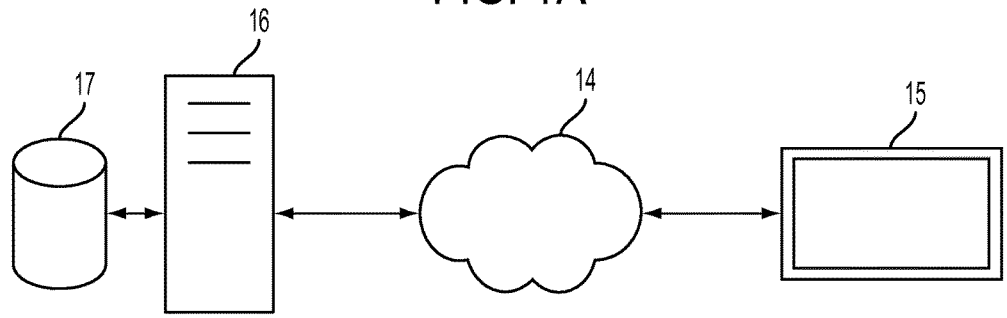
FIG. 1b shows the components of a television embodiment of a SpeechProb system and method in accordance with the present invention.
Figure 2:
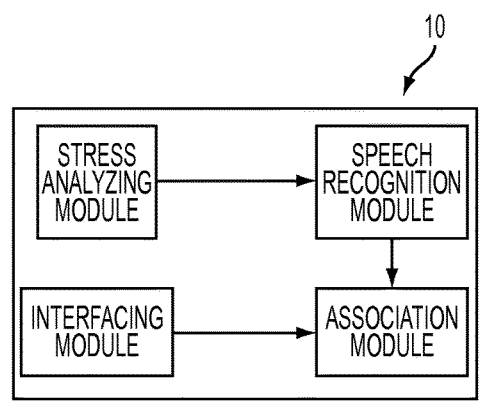
FIG. 2 is a block diagram of the operative modules of a television embodiment of a SpeechProb system and method in accordance with the present invention

Referring now to the drawings and in particular FIGS. 1*a*, 1*b*, and 2, the SpeechProb system 10 is shown having a speech recognition module, a stress analyzing module, an association module, and an interfacing module. Through these components, the SpeechProb system is able to monitor, analyze and process audible communications in real time and provide related content to the user based on the meaning of the words said and the manner in which the words are said. The stress analyzing module is operative to analyze and document stress patterns in audible communications monitored by the SpeechProb system 10. The speech recognition module enables the SpeechProb system 10 to translate words and phrases in audible communications into text. The text and the stress analysis is then transmitted to the association module, which highlights predetermined key words in the text and uses the results of the stress analysis, along with profile data related to the user, such as user preferences, present or common (such as home) location, to associate desired content with the key words. It is contemplated that the desired content is typically links to websites or information from websites which related to the key word or combination of key words (considering the stress level and the user profile data). Once the association module processes the audible communication input, the processed data is then submitted to the user by the interface module.

The interface module will provide the key words and desired content to users in a manner which is depend on how SpeechProb is employed by the user at that time. In a scenario wherein a user is on a phone call and SpeechProb has been initiated for that call, SpeechProb will operate to capture the audio conversation between the user's phone 11 and the third party phone 12 (or any other device having computing and telecommunication capabilities, such as a tablet) through client software on the users phone 11. It is contemplated that such a call will be connected through a cell phone tower 13, but understood that it may be connected through conventional telephone lines or a VoIP service over a computer network, such as the Internet 14 (including without limitation Skype, Google Voice). In a scenario wherein a user is watching television and has SpeechProb initiated on a television (or set top box connected to a television) 15, SpeechProb will operate to capture the audio broadcast by the television 15.

In one embodiment, the client software includes the speech recognition module, stress analyzing module, association module, and interfacing module, along with a communications protocol to enable it and communicate with a SpeechProb server 16 over the Internet 14 for supplemental data on a database 17 pertaining to user profiles, key words, and associations between key words and desired content. In another embodiment, the client software includes only the interfacing module and communications protocol, and data embodying the relevant audible communication is forwarded unprocessed to the SpeechProb server 16 having the speech recognition module, stress analyzing module, association module. In other embodiments, the speech recognition module, stress analyzing module, association module, and/or interfacing module may be embodied in whole or in part in the client software and the speech recognition module, stress analyzing module, association module, and/or interfacing module may be embodied in whole or in part on the SpeechProb server 16 in a complimentary fashion and/or in a manner which provides redundancy. In other embodiments, the speech recognition module, stress analyzing module, association module, and/or interfacing module may be embodied in whole or in part on a SpeechProb server 16, a cloud based server (whether embodied as the SpeechProb server 16 or a discrete remote server), the client software, or a mix there between. In such an embodiment, the function of the SpeechProb system 10 may be accessible on a host machine through a web interface, dedicated application, or other interface module.

Figure 3:
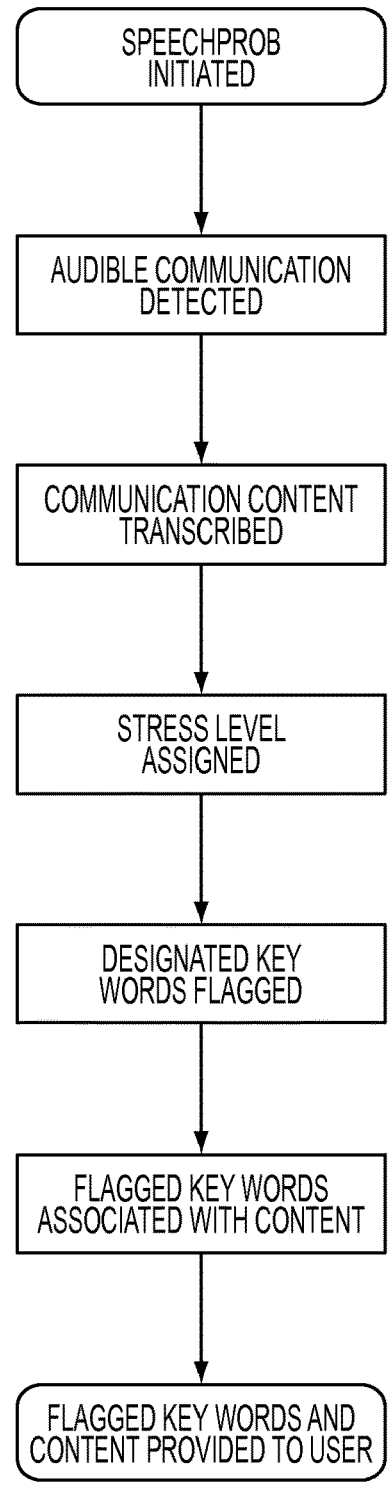
FIG. 3 shows the process in which a SpeechProb system presents to a user the content related to words spoken or heard by the user in accordance with the present invention.

Referring now to FIG. 3, when SpeechProb is initiated on a host machine, such as a smartphone or television, it initially monitors the host machine for input or output of audible communication. When audible communication is detected, the communication content is transcribed by the speech recognition module and a stress level is assigned to words in the communication by the stress analyzing module. In scenarios wherein the audible communication is in the form of audio on a call, audio from a radio source, or audio from television or movie programming, the speech recognition module and stress analyzing module operate in their conventional manner. In scenarios wherein the audible communication is in the form of television or movie programming and close caption information is available, the speech recognition module operates to extract the closed caption information while the stress analyzing module continues to analyze the audio for stress levels. When advertising content on the television/movie or radio is producing audible communication, the SpeechProb system can be set to ignore all advertising, process all advertising, or allow a user to select at the time it is being heard whether the user would like the audio to be processed or ignored.

Once the speech recognition module and stress analyzing module perform their respective functions on the audible communication, the association module flags all key words which have been previously designated by an administrator of the system and associates related content with each of the flagged key words. The interface module then provides associated content to the user on the host machine along with the key word the content is associated with.

If operating on a television, the interface module displays the related content on the screen by either overlaying the content or squeezing back the television programming. It is contemplated that either of these options may be selected by the user. If operating on over a phone call, the interface module can be selected by the user to provide either an IVR at the end of the call, provide a soft voice under/IVR, or display on the display screen of the phone during or at the end of the call. It is contemplated that if the provision of a soft voice under/IVR is selected, it may be selected to break into the conversation or provide an audible notification (such as a beep) that related content has been delivered and allow a user to press a key or verbalize a predetermine accessing phrase to instruct the voice under/IVR to proceed.

For any host machine, it is contemplated that the SpeechProb system 10 may be initiated on a host machine by through a remote device. In such a configuration, the SpeechProb system 10 may operate in the background and/or without the knowledge of the operator of the host machine, as well as be controlled remotely provide outputs to remote devices.

Rules Engine.

Rules processing of, and decisions associated with SpeechProb system can leverage the backend system (a remote server), a mobile system, or both. Some data may only be available to application programs running on the mobile device. For example, the precise current location of a user or other phone/device attributes is available to the mobile system. The SpeechProb system allows the system administrator to define targeting rules at the backend system. The rules results are then pushed to the client application and executed on a mobile and or fixed device via SMS, MMS, e-mail, voice mail, etc. Before sending a message to the client application, the backend system checks the character strings in the conversation against any of the rules stored (including any rules as to how to handle varying stress levels for the various strings by any of the participants in the conversation). If one or more matches of rules are found, one or more string of characters (e.g., words) is converted into link sent to the application user in one or more forms of communications as stated herein. In one embodiment, the string of speech characters converted into links and targets pointed to by the links are selected by the application running on the mobile device, and not by the speech originator sender.

In one embodiment, the set of spoken words converted into links may evolve or change as the attribute values driving the rules change. For example, if a rule is dependent on the user's location, the set of converted spoken words may change as the user(s) moves to a new location.

If 5 people are in a conversation, then each person might receive a different SpeechProb message, depending on targeting attempted by each application running on the device. The same is true if only two people are in the conversation.

Rules Engine; Client Processing of Rules.

When the client application is about to display conversation result message, it first analyses the locally stored set of rules to determine if the message contains words which must be converted to hyperlinks. First the set of rules are analyzed to determine the attributes required to invoke the rules. This is done to avoid acquiring unnecessary information not needed by the rules. After the set of required attributes is determined, the actual attribute values are acquired. The values may include, for example, the following:

- the user's current physical location (latitude, longitude, location accuracy)
- the user's current location translated into a POI (Point of Interest), for example "Starbucks Fort Lauderdale, Fla." or "1303 Las Olas Blvd. Fort Lauderdale, Fla."
- the users profile attributes, (age, gender, home country, home town, etc)
- current weather conditions (temperature, air pressure, humidity, etc)
- weather forecasts
- current time (am, pm, hour of day, etc)
- past messages sent based from the same spoken conversation
- past user's locations
- proximity of user's friends (if any friends are nearby)
- context of the previous messages (to pass on the topic of the conversation)
- previous locations visited by the users
- group dynamics (number of people in the spoken conversation, duration of the conversation, frequency of messaging, how recent messaging is)
- media shared by the group—images, video, audio, contact files, documents, etc
- previous SpeechProb shown
- previous SpeechProb selected, clicked or actioned upon When the attribute values are acquired, the set of rules are processed. The rules within the set can contain a priority value, in which case the rules are processed in priority order. Rules may require a string of characters (e.g., word), a list of character strings, a test segment, or a list of text segments as a primary the condition. The text in the message is first scanned to determine if the primary condition of the rule is satisfied. Examples of such words or text segments are:

store
snacks
film
BMW
Dunkin Donuts
Visa
Play golf
At work
Etc.

If the primary condition of the rule is satisfied, then the rest of the conditions are examined. If the remaining conditions are also evaluated as being true, the word or text segment is converted into a link.

In one embodiment, the application may decide not to evaluate the remaining rules if more than a set number of words or text segments have already been converted into links in a single message.

Examples of possible rules are as follows:

1. IF conversation is one of ['BMW', '3 serries', 'new car', 'test drive'] AND
currentlocation within 15 miles of 'Statute BMW ales and service, Coral Springs, Fla.→
createlinkt)
If the conversation contains 'BMW', '3 serries', 'new car', 'test drive' and the user
is within 15 miles of the specified BMW dealership, a message is generated
with a /ink.

2 IF conversation is one of ['cafe', 'coffee', 'Dunkin'] AND currenttime between
'7 am', '10 am' AND currentlocation within 1 miles of 'Dunkin Donuts in Florida'→createlinkO
If the conversation contains 'cafe', 'coffee', or 'Dunkin', and the current time
is between tam and 10 am and the user is within 1 miles of any Dunkin Donuts
store in Florida, a message is generated with a link.

3. IF conversation is one of ['hungry', 'food', 'burger', 'restaurant', 'snack'] AND
user.badges CONTAIN 'Burger King' AND currentlocation within 2
miles of 'Burger King'→createlinkO
If the word is 'hungry, 'food', 'burger', 'restaurant', or 'snack' and the user's profile contains the Burger King
and the user is within 2 miles of any Burger King store, a message is generated with a link.

4. IF conversation is one of ['hotel', 'sleep'] AND currentlocation is in 'USA' and
currentlocation is an 'airport'→createlinkO
If the word is 'hotel' or 'sleep' and the user currently is at an airport in the US, then a message is generated with a link.

5. 4 Friends are chatting about where to go for dinner. The context of the conversation is understood and even conversations not containing any words
obviously connected with dinner are contextually targeted. For example "Where do you want to meet?">'Meet' becomes a link related to Dinner.

6. The local temperature is going to be over 30 C today. A relevant word (today, weather, etc) a message is generated with a to give the reader more information on the weather.

7. An advertiser wants to promote a new movie. When a user discusses what to do tonight, the world "do" is linked based on the users previous affinity with movies a message is generated with a link to the specific movie.

The rules in the host device, or mobile device (e.g., client device), can be updated at any time.

By processing the rules in the mobile device, the backend system is not burdened with the additional processing and no noticeable delay is created when the generated messages are displayed in the application.

Rules Engine; Rule Related Data Transfer Between Backend System and Client.

Managing a set of rules using an administration tool is described herein. The Rule Administrator can modify the set of rules, which are stored in the backend storage system. After the set of rules are modified and marked as being ready for publishing, the backend system initiates the process of sending the rules to client applications. To save bandwidth and not to burden the clients with rules, each rule is pre-screened before sending to the client device. The pre-screening process evaluates triggering attributes in the rule which can are known to be fairly static—Examples of such triggering values are:

the user's language
the user's client platform (e.g. Android, iPhone, mobile web)
the user's home country, state or city
the user's profile completion status If the rule passes the pre-screening process, it is transferred to the client application.

Displaying or Highlighting SpeechProb.

SpeechProb may be displayed to the user in different forms. Some examples are:

Underlined word: A specific word is underlined like a hyperlink in html.
Different text formatting: The word could be differentiated by weighting system where different weight, equals different font, color, style or other text format from other words.
3D: The word can have a 3D appearance
Visual effect: The word has a visual effect—shimmer, flashing, glittering, etc that draws attention.
Background: The background color or image or movie behind the displayed messaging can change or move to indicate the word.
Vibration: The phone or device can be set to vibrate or some other motion effect when a word is displayed or processed.
Sound effect: A special tone or sound effect can be played by the device to indicate the presence of the word.

Selecting SpeechProb.

SpeechProb can be actioned or selected in different ways by the person viewing or receiving the message:

Clicking/tapping: The word can be clicked (using a mouse, wheel, buttons, joystick or other means of controlling screen actions) or tapped in the case of touch screen.
Roll-over: An on screen pointer can be positioned over the word to display its contents.
Device shaking: Shaking, flicking or moving the device in a predetermined way can "open" the word revealing its contents.
Voice activated: Speaking the highlighted work (or other predetermined keyword) can cause the word to activate.
Dedicated button/key: On a phone or other device one of the devices physical buttons or keys can be programmed to open/activate the word.
Soft key: Certain devices offer on screen or other buttons that a user can pre-program with certain actions. These can be used to activate the word.
Gesture: A predetermined finger/stylus and touch-screen gesture can trigger the word activation.

Engagement with SpeechProb.

One a word is selected, a variety of different modes of user engagement can be created. Some examples are listed below:

Pop ups: A (typically rectangular) box that covers part or all of the screen and shows the appropriate content. This can be closed in a variety of ways—clicking an object or a predetermined gesture.
Speech bubbles: A visual effect resembling a speech bubble, starburst or other engaging effect displays the content over the top of the viewed message.
Audio: Audio is played through the devices speakers or headphones
Picture in Picture: A section of the screen is established for presenting the word content (for example a video) while still showing the original message content. This could be a split screen, picture-in-picture or other visual effect.
Launch an app: Selecting the word could launch another app on the device.
Web page: Selecting the word could launch web or mobile web page.
Moving display: Selecting the word can display a moving piece of content such a ticker or a rotating cube superimposed on the display. 3D effects can be employed.
Screen swipe or rotation: Swiping the screen (say to the left) can display a new page that shows the word contents.

SpeechProb Functions:

After a word is selected/actioned a wide range of user experiences and engagements are possible. Some examples are listed below:

Advertisement: Selecting a word will often trigger some content that is paid for by a third party and can be considered an Advertisement. This can be all of the content (For example, if you select the word Dunkin Donuts, it can display content paid for by Dunkin Donuts) or alternatively it can be partially advertising. For example the word 'Cafe' might trigger a list of nearby cafes, and Dunkin Donuts might pay to be featured in the list or to have additional content or treatment. All of the other types of word response can exist as an Advertisement, or not as an Advertisement (and often as a combination/hybrid).
A list of places: A list of relevant places can be shown—for example nearby restaurants, stores, cafes.
Place information: Opening times, address, phone number, URL, map, directions, tips/recommendations, ratings, etc.
More information: More information about a particular subject or query. For example a dictionary definition, or meaning, or a list of ingredients, nutrition information, etc for a product.
A list: A list of related items, similar to a search query on an online search engine. The list can be presented in an order specific to the user, or to the query, or to the wishes of 3rd parties such an advertiser or sponsor. For example a list of airlines, or beer brands.
Map: A map of a place, sometimes with directions from the current location to the designated place. Sometimes with multiple places marked on the map (for example place where you can swim or places where you can buy bread)

Link to a site: The word can link to a 3rd party web page or page/place within another application.

Trigger a call: When the device has the ability to make a call, selecting the word may trigger a call to a person or business or other entity.

Trigger an email: When the device has the ability to send an email, selecting the word may trigger an email to a person or business or other entity.

Trigger a mobile msg: When the device has the ability to send a message, selecting the word may trigger a message to a person or business or other entity.

Show an image: Selecting the word can open an image, or a gallery of images.

Show a video: Selecting the word can play or open a video, or a gallery of videos.

Play audio file: Selecting the word can play an audio file.

Data entry method: Selecting the word can open a form or data entry method to drive what happens next. For example the word 'Restaurant' could trigger a drop down list of types of cuisine for the user to select. Once they had chosen 'Indian' a list of Indian Restaurants. Alternatively the user could be asked to rate a person, place or thing.

Timetables: Selecting a word connected to transport can trigger a timetable. For example if the user is standing close to a train station, and the word "train" is present in a message, selecting the world could show a timetable for the next trains from that station.

Weather Forecast: Selection a word can show the current or future weather conditions for a place (the current place, or another place under discussion)

List of apps: A list could show a list of available applications. For example, the word 'Game' could show a list of game apps on the device, or a list of games apps that the user might want to download to the device.

Info from a 3rd Party: Selecting a word could pull in dynamic content from a third party. For example if the user mentions the word 'Ford' then the request could be sent to Ford, along with relevant profile data, and Ford could return the details of the car they consider most appropriate for the individual. This might include dynamic pricing or other specific offer for a user.

Reviews: Selecting a word may show reviews and or ratings for a place, business, person, event, etc.

Directions: Selecting a word can display driving, walking or directions for another mode of transport to a place.

Commerce: Selecting a word can trigger a commerce event. For example it could provide functionality for the purchase of tickets, products, services, travel, accommodation, etc. This commerce functionality could be provide direct to the user, or could be through a partner such as a retailer, bank or other entity. The user could be presented with a list of possible partners to buy the product/service.

Finding Functions, Sweepstakes, Competitions.

In one embodiment, some SpeechProb based messages are assigned randomly or with hidden opportunities or rewards for the user. Examples include:

Find the word and win a prize

Find all the 10 American Airlines for SpeechProb and get 1,000 Air-miles

The person to select the 10,000th link of the day receives $1,000

Security/Public Safety.

In one embodiment, spoken words and or phrases can be weighted with or without the aid of the onboard stress analyzer to determine if a conversation represents a threat or an endangerment to public safety and based on the Rules engine threat analyzer, take any one or more of several actions. Some SpeechProb based action Examples include:

Generate message to relevant authority describing the threat level.

Record store and forward the conversation to relevant authorities.

Generate message to parent or guardian of a child's possible in appropriate behavior.

Types of Devices.

SpeechProb system can include client devices such as phone and other mobile devices as well as a range of networked devices. Examples of devices include, but are not limited to:

Mobile phones

Tablets

Smart cars

TV (integrated or through a variety of set top boxes)

Web and mobile web

Watches

SpeechProb Management Interface.

An administrator uses a online interface to manage the SpeechProb system. This allows them to control how SpeechProb is deployed. Key functionalities of this system include:

SpeechProb Management Interface; Campaign Setup.

Name of campaign: For easy reference

Target words: Which words can trigger the campaign

End and Start-time: Run dates (where needed)

User Targeting: Who should be sent SpeechProb messages

Context targeting: What conversational contexts are needed or desired for triggering the campaign.

Volume: How many of the messages are desired to be delivered.

Frequency/caps: How often should a user see a particular campaign.

Recency: How soon after one exposure to a campaign should the same user see the same campaign.

Weighting: How important is the campaign compared to other campaigns

Word weighting: How important is each word in a message or target group within the campaign.

Type of campaign: Advertising, sponsorship, information, contest, other

Content: What content is triggered by the campaign

Activation type: How can the word be triggered?

Display mode: How is the message content displayed?

Persistence: Should the message always be displayed, or is transient. How long should it be shown for?

SpeechProb Management Interface; Overall Management.

Overall Frequency cap: How many SpeechProb messages can a user see per day/week/hour/message, etc Overall Recency cap: How long (measured in time or messages/words) must elapse between one message and the next User management: Who can use the system. What access rights do they have?

SpeechProb Management Interface; Reports.

Impressions: SpeechProb message delivered

Selection rate: Number of times selected

Conversion rate: Number of times a specified end result is achieved (visiting a page, making a defined transaction, etc)

Custom reports: User defined reports

Export data: In various formats

Dashboards: Showing overview and trends of performance.

SpeechProb Management Interface; Advertising Management.

SpeechProb campaigns that are associated with Advertising have additional admin functions:

Pricing model: CPC—The advertiser pays per click; CPM—The advertiser pays per impression; CPA—The advertiser pays per post click action (defined); Sponsorship Spending cap: Limits on overall, daily, weekly, monthly campaign spend Advertisers may bid for SpeechProb. They are given an interface where they can manage their bid-for campaigns. For example they can choose how much they would be willing to pay for a particular word based message, and look at reports that show them how many messages they have bought at a particular price, and monitor the performance of the message/campaigns.

User Selections.

A user/consumer of the SpeechProb system may also be presented with an admin interface on device being accessed by the user/consumer. This allows the user/consumer to adjust the manner in which SpeechProb are presented to them and to optimize user experience.

Opt-out: User may be presented with an opt-out of certain system functions.

Category selection: What types and formats of SpeechProb would users prefer to see or not see.

Interaction preferences: How would they like to interact with SpeechProb. How do they prefer to activate SpeechProb, and how do they prefer SpeechProb to appear and function on their device.

It is contemplated that the SpeechProb may additionally include an automatic customization engine that supplements user profile data available. The customization engine tracks selections made by a user when presented with key word linked content and allows for the inclusion of a user's historic preferences or selections in its analysis of what associated content to provide in future instances. Such customization may allow for added refinement of the content to be provided and/or in the presentation of the content (such as which order it is presented in).

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A method for processing flagged words in audible communications, comprising the steps of:
designating at least one key word, defined as a single word or combination of words, wherein the step of designating includes linking each key word with categorical or specified digitally available information;
detecting by a host machine an audible communication containing at least one word;
generating a transcription of at least a portion of the detected audible communication so as to produce an input derived from the detected audible communication;
analyzing the input derived from the detected audible communication, wherein the step of analyzing includes at least automatically highlighting all key words in the transcription of the detected audible communication;
retrieving the categorical or specified digitally available information which was linked to at least one of the key words highlighted in the step of analyzing; and
providing by said host machine the retrieved digitally available information, along with the key word to which the retrieved digitally available information was linked, so as to automatically present information that has been retrieved and is related to content in the input derived from the detected audible communication.

2. The method of claim 1, wherein the step of analyzing additionally includes examining the detected audible communication for stress levels.

3. The method of claim 2, wherein the step of retrieving is additionally based on stress level information.

4. The method of claim 2, wherein the step of generating is defined by extracting available closed caption information.

5. The method of claim 1, wherein the step of analyzing additionally includes examining user profile information related to a user associated with the host machine.

6. The method of claim 5, wherein the step of retrieving is additionally based on user profile information.

7. The method of claim 1, wherein the step of generating is defined by at least one of the translation of words and phrases in the audible communication into text and extracting available closed caption information.

8. The method of claim 1, wherein the step of providing is defined by displaying the retrieved digitally available information along with the key word to which the retrieved digitally available information was linked on a display screen integral with the host machine.

9. The method of claim 1, wherein the step of providing is defined by playing an audible message including the retrieved digitally available information along with the key word to which the retrieved digitally available information was linked on the host machine.

10. The method of claim 1, wherein the step of generating is performed by the host machine.

11. The method of claim 1, wherein the step of analyzing is performed by the host machine.

12. The method of claim 1, wherein the step of retrieving is performed by the host machine.

13. The method of claim 1, additional comprising the step of providing a remote processing machine operatively connected to said host machine, wherein the step of generating is performed by the remote processing machine.

14. The method of claim 1, additional comprising the step of providing a remote processing machine operatively connected to said host machine, wherein the step of analyzing is performed by the remote processing machine.

15. The method of claim 1, additional comprising the step of providing a remote processing machine operatively connected to said host machine, wherein the step of retrieving is performed by the remote processing machine.

16. A method for processing flagged words in audible communications, comprising the steps of:
designating at least one key word, defined as a single word or combination of words, wherein the step of designating includes linking each key word with categorical or specified digitally available information;
facilitating by a host machine an audible communication containing at least one word;

generating a transcription of at least a portion of the facilitated audible communication so as to produce an input derived from the detected audible communication;

analyzing the input derived from the detected audible communication, wherein the step of analyzing includes at least automatically highlighting all key words in the transcription of the facilitated audible communication, examining the facilitated audible communication for stress levels, and examining user profile information related to a user associated with the host machine;

in response to the step of analyzing, retrieving the categorical or specified digitally available information which was linked to at least the key words highlighted in the step of analyzing, stress level information and user profile information; and providing by said host machine the retrieved digitally available information, along with the key word to which the retrieved digitally available information was linked, so as to automatically present information that has been retrieved and is related to content in the input derived from the detected audible communication.

17. The method of claim 16, wherein the user profile information includes at least the location of the host machine and retrieved categorical or specified digitally available information is specified to the location of the host machine.

18. The method of claim 16, wherein the step of providing is defined by displaying the retrieved digitally available information along with the key word to which the retrieved digitally available information was linked on a display screen integral with the host machine.

19. The method of claim 16, wherein the step of providing is defined by playing an audible message including the retrieved digitally available information along with the key word to which the retrieved digitally available information was linked on the host machine.

20. The method of claim 16, additional comprising the step of providing a remote processing machine operatively connected to said host machine, wherein at least one of the steps of generating, analyzing and retrieving is performed by the remote processing machine.

* * * * *